United States Patent Office 3,663,552
Patented May 16, 1972

3,663,552
2'-SUBSTITUTED-CINCHONA ALKALOIDS
John P. Yardley, King of Prussia, Royal E. Bright, Philadelphia, Richard W. Rees, Newtown Square, and Herchel Smith, Bryn Mawr, Pa., assignors to American Home Products Corporation, New York, N.Y.
No Drawing. Continuation-in-part of application Ser. No. 692,277, Dec. 21, 1967. This application Apr. 9, 1970, Ser. No. 27,119
Int. Cl. C07d 43/24
U.S. Cl. 260—284
12 Claims

ABSTRACT OF THE DISCLOSURE

2'-substituted alkaloids of the cinchona series, especially 2'-substituted quinine, quinidine, cinchonine, cinchonidine and dihydro analogs of Formulas I and II, and their salts, are prepared by treating ar-N-oxides of the alkaloids with the corresponding organometallic reagent and, if desired, converting the free bases thus formed into pharmaceutically-acceptable acid-addition salts. The new compounds are pharmacologically active, especially anti-malarially and anti-arrhythmically.

---

This application is a continuation-in-part of co-pending application Ser. No. 692,277, entitled "2'-Substituted-Cinchona Alkaloids," filed Dec. 21, 1967, now abandoned.

This invention relates to 2'-substituted cinchona alkaloids. More particularly, it is concerned with novel 2'-substituted derivatives of quinone, quinidine, dihydroquinine, dihydroquinidine, cinchonine, cinchonidine, dihydrocinchonine, dihydrocinchonidine, and the like. The new compounds, and their salts, possess valuable pharmacological properties, especially anti-malarial activity and anti-arrhythmic activity.

DESCRIPTION OF THE INVENTION

The new compounds of this invention are selected from those of Formula I or II

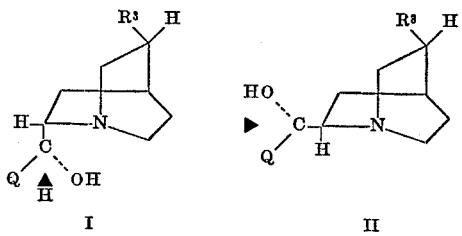

or pharmaceutically-acceptable acid-addition salts thereof, wherein
Q is a radical of the formula

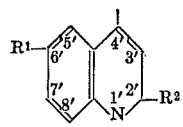

$R^1$ ih hydrogen or methoxy;
$R^2$ is (lower)alkyl, (loweralkenyl, (lower)alkynyl, [(lower)alkyl]$_2$N—(CH$_2$)$_n$—, wherein $n$ is from about 3 to about 10, cyclo(lower)alkyl, halo(lower)alkyl, halo(lower)alkenyl, aryl, or aryl substituted with from 1 to 5 halo, (lower)alkyl, (lower)alkenyl, (lower)alkynyl, halo(lower)alkyl, trifluoromethyl, (lower)alkoxy or halo(lower)alkenyl groups, aryl(lower)alkyl, or aryl (lower)alkyl groups wherein the aryl moiety is substituted with from 1 to 5 halo, (lower)alkyl, (lower)al-kenyl, (lower)alkynyl, halo(lower)alkyl, trifluoromethyl, (lower)alkoxy or halo(lower)alkenyl groups; and
$R^3$ is ethyl or vinyl, provided, however, when $R^1$ is methoxy in Formula I, $R^2$ is other than phenyl.

Special mention is made of particularly important compounds of this invention. These are compounds of Formula I wherein $R^1$ is hydrogen or methoxy, $R^2$ is (lower)alkyl, trifluoromethyl, [(lower)alkyl]$_2$—(CH$_2$)$_n$— wherein $n$ is from about 3 to about 10, (lower)alkoxyphenyl, (trifluoromethyl)phenyl, benzyl, halobenzyl, (trifluoromethyl)benzyl, or halophenyl; and R is ethyl or vinyl; and compounds of Formula II wherein $R^1$ is hydrogen or methoxy, $R^2$ is lower(alkyl) phenyl, trifluoromethyl)phenyl, [(lower)alkyl]$_2$N—(CH$_2$)$_n$— wherein $n$ is from about 3 to about 10, (lower)alkoxyphenyl, benzyl, halobenzyl, (trifluoromethyl)benzyl or halophenyl; and $R^3$ is ethyl or vinyl.

Especially useful embodiments of this invention are:
2'-methylquinidine, a compound of Formula II, wherein $R^1$ is methoxy, $R^2$ is methyl and $R^3$ is vinyl, either as the free base or as the acid addition salt with hydrogen chloride;

2'-ethylquinidine, a compound of Formula II, wherein $R^1$ is methoxy, $R^2$ is ethyl and $R^3$ is vinyl, either as the free base or as the acid addition salt with hydrogen chloride;

2'-phenylquinidine, a compound of Formula II, wherein $R^1$ is methoxy, $R^2$ is phenyl, and $R^3$ is vinyl, either as the free base or as the acid addition salt with hydrogen chloride; and 2'-(4-chlorophenyl)-quinidine, a compound of Formula II, wherein $R^1$ is methoxy, $R^2$ is 4-chlorophenyl and $R^3$ is vinyl, either as the free base or as the acid addition salt with hydrogen chloride;

2'-cyclopropylquinidine, a compound of Formula II, wherein $R^1$ is methoxy, $R^2$ is cyclopropyl and $R^3$ is vinyl, either as the free base or as the acid addition salt with hydrogen chloride;

2'-n-propylquinidine, a compound fo Formula II, wherein $R^1$ is methoxy, $R^2$ is n-propyl and $R^3$ is vinyl, either as the free base or as the acid addition salt with hydrogen chloride;

2'-isopentylquinidine, a compound of Formula II, wherein $R^1$ is methoxy, $R^2$ is isopentyl and $R^3$ is vinyl, either as the free base or as the acid addition salt with hydrogen chloride;

2'-[(dimethylamino)-n-propyl]quinidine, a compound of Formula II, wherein $R^1$ is methoxy, $R^2$ is dimethylamino-n-propyl and $R^3$ is vinyl, either as the free base or as the acid addition salt with hydrogen chloride;

2'-t-butylquinidine, a compound for Formula II, wherein $R^1$ is methoxy, $R^2$ is t-butyl and $R^3$ is vinyl, either as the free base or as the acid addition salt with hydrogen chloride;

2'-[p-(trifluoromethyl)phenyl]quinidine, a compound of Formula II, wherein $R^1$ is methoxy, $R^2$ is p-(trifluoromethyl)phenyl and $R^3$ is vinyl, either as the free base or the acid addition salt with hydrogen chloride;

2'-(p-fluorobenzyl)quinidine, a compound of Formula II, wherein $R^1$ is methoxy, $R^2$ is p-fluorobenzyl and $R^3$ is vinyl, either as the free base or as the acid addition salt with hydrogen chloride;

2'-n-propyldihydroquinidine, a compound of Formula II, wherein $R^1$ is methoxy, $R^2$ is n-propyl and $R^3$ is ethyl, either as the free base or as the acid addition salt with hydrogen chloride;

2'-phenyldihydroquinidine, a compound of Formula II, wherein $R^1$ is methoxy, $R^2$ is phenyl and $R^3$ is ethyl, either as the free base or as the acid addition salt with hydrogen chloride;

2'-(p-chlorophenyl)dihydroquinidine, a compound of Formula II, wherein $R^1$ is methoxy, $R^2$ is p-chlorophenyl and $R^3$ is ethyl, either as the free base or as the acid addition salt with hydrogen chloride.

2'-[p-(trifluoromethyl)phenyl]dihydroquinidine, a compound of Formula II, wherein $R^1$ is methoxy, $R^2$ is p-(trifluoromethyl)phenyl and $R^3$ is ethyl, either as the free base or as the acid addition salt with hydrogen chloride;

2'-(p-fluorophenyl)quinine, a compound of Formula I, wherein $R^1$ is methoxy, $R^2$ is p-fluorophenyl and $R^3$ is vinyl, either as the free base or as the acid addition salt with hydrogen chloride;

2'-(p-methoxyphenyl)quinine, a compound of Formula I, wherein $R^1$ is methoxy, $R^2$ is p-methoxyphenyl and $R^3$ is vinyl, either as the free base or as the acid addition salt with hydrogen chloride;

2'-(p-chlorophenyl)quinine, a compound of Formula I, wherein $R^1$ is methoxy, $R^2$ is p-chlorophenyl and $R^3$ is vinyl, either as the free base or as the acid addition salt with hydrogen chloride;

2'-[p-(trifluoromethyl)phenyl]quinine, a compound of Formula I, wherein $R^1$ is methoxy, $R^2$ is p-(trifluoromethyl)phenyl and $R^3$ is vinyl, either as the free base or as the acid addition salt with hydrogen chloride;

2'-($\alpha,\alpha,\alpha$-trifluoro-p-tolyl)dihydroquinine, a compound of Formula I, wherein $R^1$ is methoxy, $R^2$ is p-(trifluoromethyl)phenyl and $R^3$ is ethyl, either as the free base or as the acid addition salt with hydrogen chloride.

Those skilled in the art will recognize that the instant compounds are 2'-substituted derivatives of the cinchona alkaloids. Thus, quinine, dihydroquinine, cinchonidine and dihydrocinchonidine are the parent substances for the instant compounds of Formula I; and quinidine, dihydroquinidine, cinchonine and dihydrocinchonine are the parent substances for compounds of Formula II. These alkaloids provide valuable starting materials for the instant compounds, as will be outlined in detail hereinafter.

When used herein and in the appended claims, the term "lower(alkoxy)" contemplates hydrocarbonoxy radicals, straight and branched chain, containing from about 1 to about 6 carbon atoms, and includes methoxy, ethoxy, n-propoxy, i-propoxy, n-butoxy, t-butoxy, n-pentoxy, n-hexoxy, 2-methylpentoxy, and the like. The term "(lower)alkyl" contemplates hydrocarbon radicals, straight and branched chain, containing from about 1 to about 6 carbon atoms, and includes methyl, ethyl, n-propyl, i-propyl, n-butyl, t-butyl, n-pentyl, n-hexyl, 2-methylpentyl, and the like. The term "(lower)alkenyl" contemplates mono- and di-olefinic hydrocarbon radicals, straight and branched chain, containing from about 2 to about 6 carbon atoms, and includes vinyl, alkyl, 2-methyl-2-butenyl, isopropenyl, 1,3-butadienyl, 2-pentenyl, 3-hexenyl and the like. The term "(lower)alkynyl" comtemplates mono- and diacetylenic hydrocarbon radicals, straight and branched chain, containing from about 2 to about 6 carbon atoms, and includes ethynyl, propargyl, 2-butynyl, 1,3-butadynyl, 2-pentynyl, 3-hexynyl and the like. The term "cyclo(lower)alkyl" contemplates saturated cyclic hydrocarbon radicals containing from about 3 to about 6 carbon atoms, and includes cyclopropyl, cyclobutyl, cyclopentyl, cyclohexyl and the like. The term "halo" when used by itself or in association with (lower)alkyl, (lower)alkenyl or aryl contemplates halogens, and includes fluorine, chlorine, bromine, and iodine. The term "aryl" contemplates mono-, di- and tricarbocyclic aryl radicals, and includes phenanthryl, naphthyl and phenyl radicals, which can be unsubstituted or substituted with from 1 to 5 substituents as defined above, with reference to Formulae I and II.

As will be readily apparent to those skilled in the art, compounds of Formulae I and II are bases and react with and form useful salts with organic and inorganic acids, such as hydrochloric, hydrobromic, sulfuric, phosphoric, methanesulfonic, acetic, lactic, succinic, maleic, aconitic, phthalic, tartaric, and the like. These salts are especially useful to prepare soluble pharmaceutical dosage forms. In addition, certain of them are more rapidly absorbed than the free bases, permitting quicker onset of action and higher blood levels.

The compounds of this invention can be prepared in several different ways. One especially convenient manner comprises reacting a mono-ar-N-oxide of Formula III or IV

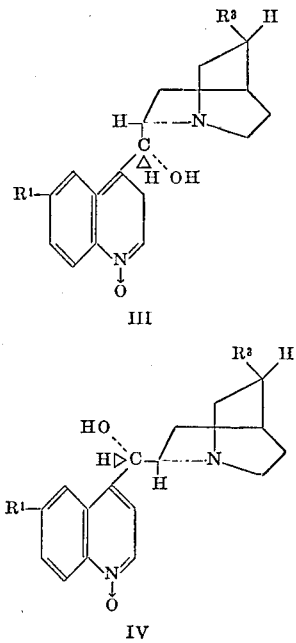

wherein $R^1$ and $R^3$ are as hereinabove defined, with an organomagnesium halide of the formula $$R^2MgX$$

wherein $R^2$ is as hereinabove defined and X is chloride, bromide or iodide until formation of the grignard adduct corresponding to Formula I and II is substantially complete, decomposing said adduct with water or an acid such as hydrogen chloride or an obvious chemical equivalent thereof, such as ammonium chloride, and recovering the free base compound of Formula I or II, or, if desired, converting the free base, by reaction with an organic or inorganic acid into an acid addition salt, and recovering the said salt.

The mono-ar-N-oxides of Formulae III or IV can be prepared by treating the corresponding alkaloid with hydrogen peroxide in glacial acetic acid by the method of M. Ishikawa et al., Skika Zairo Kenkyusho Hokoku, 2, 181–188 (1961) or alternately by the mehod of E. Ochiai, J. Pharm. Soc. (Japan), 68, 109 (1948). The organomagnesium halides are easily prepared by methods well known to those skilled in the art. In this connection, reference is made to the compilation in Kharash and Reinmuth, "Grignard Reactions of Non-Metallic Substances," Prentice-Hall, Inc., New York, 1954, and to the specific references cited therein.

In proceeding according to the above method, the process is normally conducted in benzene-ether mixture at the reflux point, conditions which normally insure a homogeneous reaction mixture but other solvents or combinations with tetrahydrofuran, dioxane, toluene, and the like, can be used. Brief, for example, 15–45 minute, reflux periods appear to offer optimum reaction conditions.

An alternative and often useful method for preparing the compounds of this invention consists in treating N-oxides of Formula III or IV with the corresponding organo lithium compounds of the formula $$R^2Li$$

Conversion of the free bases of Formula I or II to the corresponding acid addition salt is accomplished by treating a solution of the base in a solvent, such as a lower alcohol, i.e. methanol or isopropanol, a ketone, such as acetone or an ether, such as diethyl ether, with the stoichiometrically-equivalent amount of the desired acid, then evaporating the solvent, leaving the salt as a residue. If desired, it can be recrystallized from a solvent, such as a lower alcohol or a ketone or mixtures of such solvents.

The dihydroquinine and dihydrocinchonidine of Formula I and the dihydrocinchonine and dihydroquinidine of Formula II may also be prepare by hydrogenating the corresponding quinine, cinchonidine, cinchonine or quinidine. This hydrogenation is accomplished by conventional means of hydrogenating ethenoid unsaturated, for example, by dissolving unsaturated compounds or acid addition salts of Formula I or II in a suitable solvent, i.e. methanol, which is added to palladized charcoal and reacted with hydrogen at a temperature of about 5° C. to about 50° C., preferably at low to moderate pressures, e.g. from about 1 to about 3 atmospheres, preferably about 1 atmosphere until absorption of the equivalent amount or a slight excess, e.g. up to about 1.1 moles of hydrogen is substantially complete. The catalyst used is preferably a noble metal catalyst, finely divided or supported, on a carrier, for example, platinum or palladium, or palladium on carbon or palladium on charcoal. Following hydrogenation, the product is recovered by conventional means, i.e. filtering off the catalyst and taking the filtrate to dryness, dissolving the residue in water and basifying with a base (i.e. NaOH) and extracting with an organic solvent (i.e. $CHCl_3$) and crystallizing the residue from an appropriate solvent (i.e. ethyl alcohol).

As is mentioned hereinabove, the new 2'-substituted cinchona alkaloids of Formulae I and II, and their salts, of this invention have been found to possess useful pharmacological properties, especially as anti-malarials and as anti-arrhythmic agents. This makes them useful in the treatment of conditions in the living organism responsive to administration of active anti-malarial agents, such as the symptoms caused by malaria. In addition, they are also useful to treat conditions in the living organism responsive to administration of active anti-arrhythmic agents, such as cardiac arrhythmia. Such agents are effective for the treatment of auricular fibrillation by restoring natural rhythm. Furthermore, the instant compounds are of particular value for such purposes because they exhibit excellent response, have a rapid onset of action and relatively low toxicity.

The compounds of this invention can be administered alone or in combination with pharmaceutically acceptable carriers, the proportion of which is determined by the solubility and chemical nature of the compound, selected route of administration and standard pharmaceutical practice. For example, they may be administered orally in the form of tablets or capsules containing such excipients as starch, milk sugar, certain types of clay, and the like. They may be administered sublingually in the form of troches or lozenges in which the active ingredient is mixed with sugar and corn syrups, flavoring agents and dyes; and then dehydrated sufficiently to make the mixture suitable for pressing into a solid, compact form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound selected. Furthermore, it will vary with the particular subject under treatment. Generally, treatment is initiated with small dosages, substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects. For cardiac arrythmias they are used preferably at a level that is in the range of from about 0.1 mg./kg. to about 30 mg./kg. per day, although as mentioned, variations will occur. For anti-malarial purposes they are used preferably at a level that is in the range of from about 5 mg./kg. to about 600 mg./kg. per day, although as mentioned, variations will occur. However, a dosage level that is in the range of from about 10 mg./kg. to about 100 mg./kg. per day is most desirably employed in order to achieve most effective results.

Anti-malarial activity was measured against *P. berghi* in mice and *P. gallinaceum* in chicks by methods similar to those described by T. S. Osdene, P. B. Russell and L. Rane, J. Med. Chem., 10, 431 (1967) as follows:

Mice are infected with a lethal dose of *Plasmodium berghi* three days prior to the administration of the compound at each of three dose levels. The compound test is mg./kg. of body weight. Routinely, the compounds are administered subcutaneously in oil. The mean survival time of infected control mice is 7.0±5.0 days. Extension of survival time of chemically-treated mice is interpreted as evidence of antimalarial activity.

In the chick test, 9–12 day-old white Leghorn cockerels of uniform stock, which are delivered to the laboratory when one day old and then maintained under standard conditions, including a non-medicated diet, until ready for test. Chicks on test are given intraveneous injection of 0.2 ml. of heparinized heart's blood infected with *Plasmodium gallinaceum* and having a minimum of 80–90% parasitized red blood cells. The parasitized blood is drawn by cardiac puncture from donor birds infected 72 hours earlier with *Plasmodium gallinaceum*. Donor strains are maintained in separate groups of chicks, 14–16 days old, that also received inoculations of heparinized infected heart's blood. In each experiment 100% of the untreated controls die within 72–96 hours post-infection. In order to check factors such as changes in infectivity, or in susceptibility of the host, or to detect technical errors, a group of infected animals treated with chloroquinine at dose levels producing definite increases in survival times is included as a positive control in every experiment.

Candidate compounds are dissolved or suspended in peanut oil. Treatment in the chick consists of a single dose administered either subcutaneously or orally immediately after infection. Each experiment is done with graded doses, and increases in dose levels of highly active compounds are followed by increases in survival times. If an active drug is toxic for the host, its toxicity is a limiting factor to changes in dosages. Deaths that occurred within 48 hours after infection and treatment are considered as deaths due to the toxic effects of the test compound. Chicks with survival periods of 30 days are recorded as cured. An increase of 100% in survival time is recognized as the minimum significantly effective response to the antimalarial activity of a candidate compound.

Anti-arrythmic activity was tested by a standard pharmacological procedure similar to that described by G. S. Dawes, Brit. J. Pharmacol., 1, 90 (1946).

DESCRIPTION OF THE PREFERRED EMBODIMENTS

The following examples are given by way of illustration and are not to be construed as limitations of this invention, many variations of which are possible without departing from the scope and spirit thereof.

EXAMPLE 1

2'-methylquinidine and hydrochloride

Quinidine ar-N-oxide (2.0 g., $5.9 \times 10^{-3}$ moles) in 40 ml. of anhydrous benzene is added dropwise to a stirred solution of methyl magnesium iodide in ether (25 ml. 3 M, $7.5 \times 10^{-2}$ moles) during 15 minutes. The reaction mixture is refluxed under nitrogen for ½ hour, cooled to —10° C. and treated with ice-water followed by an excess of 2 N HCl (some undissolved yellow solid is obtained at this stage; it is dissolved in warm water and added to the reaction mixture). The aqueous phase is separated, washed with ether and basified strongly with ice-potassium hydroxide solution. Chloroform (250 ml.) is added, the mixture is stirred vigorously for a few minutes and filtered through filter aid. The precipitate and filter aid are re-extracted with chloroform, filtered and washed with chloroform. The chloroform layer is separated from the aqueous filtrate, washed with brine and dried ($K_2CO_3$). Evaporation of the chloroform affords 2.1 g. residue, readily crystallizing on trituration with methanol to give 2'-methylquinidine (1.5 g.) M.P. 150° C. (as the methanol solvate). NMR 2.56 (3H singlet, 2'-methyl), 3.45 (3H singlet) methanol solvate, 3.82 (3H singlet, 6'-$CH_3O$) and no absorption below 8 p.p.m. as in quinidine, 8.50 (1H doublet, $J=4.5$ c.p.s., 2'-H) or guinidine ar-N-oxide 8.48 (1H doublet, $J=10$ c.p.s.; 2'-H). The analytical sample (from methanol), M.P. 160° C. loses methanol of solvation. After drying for 5 hrs. at 80° in vacuo, the product is analyzed.

*Analysis.*—Calcd. for $C_{21}H_{26}N_2O_2$ (percent): C, 74.52; H, 7.74; N, 8.28. Found (percent): C, 74.24; H, 7.25; N, 8.32.

2'-methylquinidine base is treated in 4 ml. of isopropanol with an excess of 6.6 N isopropanolic HCl (2 ml.). The product is precipitated by addition to ether and the precipitate (550 mg.) is recrystallized from acetone. The analytical sample crystallized from isopropanol-acetone melts at 202–218° C., with decomposition.

*Analysis.* — Calcd. for $C_{21}H_{28}N_2O_2Cl_2 \cdot \frac{1}{4}H_2O$ (percent): C, 60.55; H, 6.91; N, 6.74; Cl, 17.05. Found (percent): C, 60.41, 60.61; H, 7.08, 7.04; N, 6.64; Cl, 15.07.

EXAMPLE 2

2'-ethylquinidine and hydrochloride

Quinidine-ar-N-oxide (10.0 g.) in 200 ml. of anhydrous benzene is added slowly to 3 molar ethyl magnesium bromide in ether (125 ml.) under nitrogen. The mixture is refluxed ½ hour, chilled to —10° C. and an ice-water slurry is added cautiously. When the decomposition is complete, 2 N HCl is added to acidify the mixture. The precipitate which remains is dissolved by addition of more water. The layers are separated and the aqueous phase washed once with ether. The combined organic phases are back-washed once with a small quantity of 2 N HCl which is added to the aqueous phase. This is then made strongly basic by the addition of an ice-aqueous KOH mixture and filtered through filter aid. The filter cake is washed exhaustively with a $CHCl_3$:MeOH (1:1) mixture. The layers in the filtrate are separated and the aqueous phase extracted three times with $CHCl_3$. The combined organic phase is washed with brine, dried over $K_2CO_3$ and stripped to a glass under high vacuum. The title compound is obtained as crystals from heptane (4.0 g.) M.P. 135–139° C. The analytical sample is crystallized from heptane, M.P., 138–140° C.

$\lambda_{max.}^{KBr}$ 3.48, 6.19, 6.26, 6.42, 6.67$\mu$

NMR: 3 proton triplet at $\delta$ 1.23 ($CH_3$ of 2' ethyl group), 3 proton singlet at $\delta$ 3.81 (methoxy group), multiplet $\delta$ 4.8–6.3 (vinyl group +OH), singlet at $\delta$ 7.14, 7.30, 7.45, doublet at $\delta$ 7.90 (4 aromatic protons).

*Analysis.*—Calcd. for $C_{22}H_{28}N_2O_2$ (percent): C, 74.96; H, 8.01; N, 7.95. Found (percent): C, 75.10; H, 8.31; N, 7.95.

2'-ethylquinidine hydrochloride (amorphous solid, $\lambda_{max.}^{KBr}$ 3.16 (broad) 3.50, 3.93 (broad), 4.30 (shoulder) 6.20, 6.69, 6.88$\mu$)

is prepared from the base by the procedure in Example 1. Recrystallized from isopropyl alcohol and ethyl ether gives a M.P. 171–175° C.

EXAMPLE 3

2'-phenylquinidine and hydrochloride

Quinidine-ar-N-oxide (10.0 g.) in 200 ml. of anhydrous benzene is added slowly to 3 molar phenyl magnesium bromide in ether (125 ml.) under nitrogen. After refluxing for ½ hour the reaction mixture is chilled to —10° C. and an ice-water mixture is added cautiously. When the decomposition is complete, the mixture is acidified with 2 N HCl and all of the soluble precipitate is dissolved with additional water. The layers are separated and the aqueous phase washed once with ether. The combined organic phase is backwashed once with a small portion of 2 N HCl which is added to the aqueous phase. This is then made strongly basic by adding ice-aqueous KOH mixture. The precipitate is removed by filtration through filter aid and the cake is washed exhaustively with $CHCl_3$:MeOH (1:1).

$CHCl_3$:MeOH (1:1)

The layers in the filtrate are separated and the aqueous phase is extracted three times with $CHCl_3$. The combined organic phases are washed with brine, dried over $K_2CO_3$ and solvent removed in vacuo. Crystallization of the resultant glass from methanol-ether yields the title compound, 4.4 g., M.P. 193–196° C.

$\lambda_{max.}^{KBr}$ 3.02, 3.35, 3.48, 6.20, 6.29, 6.48, 6.70$\mu$

NMR: 3 proton singlet $\delta$ 3.83 (MeO group), 4 proton multiplet $\delta$ 4.55–6.31 (vinyl protons +OH), 9 proton multiplet $\delta$ 7.02–8.18 (aromatic protons).

*Analysis.*—Calcd. for $C_{26}H_{28}N_2O_2$ (percent): C, 77.97; H, 7.05; N, 7.00. Found (percent): C, 78.06; H, 6.70; N, 6.83.

2'-phenylquinidine hydrochloride (amorphous solid, $\lambda_{max.}^{KBr}$ 3.05 (broad), 3.50, 3.98 (broad), 4.55 (shoulder), 6.20, 6.67, 6.89$\mu$)

is prepared by the procedure described for the preparation of the hydrochloride in Example 1.

EXAMPLE 4

2'-(4-chlorophenyl)quinidine and hydrochloride 4-bromochlorobenzene (14.2 g.) in 15 ml. of ether is dropped into a stirred mixture of 1.92 g. of magnesium metal in 25 ml. of ether and trace of iodine at such a rate that the ether boils slowly. After the reaction has subsided, the stirred mixture is refluxed an additional hour. This solution is cooled and filtered through a pad of glass wool and there is added at a moderate rate, while stirring, 2.0 g. of quinidine-ar-N-oxide in 40 ml. of anhydrous benzene. After refluxing for one-half hour, the reaction mixture is chilled to —10° C. and an ice-water mixture is added cautiously. When decomposition is complete, excess 2 N HCl is added followed by additional water to dissolve all of the precipitate. The layers are separated and the aqueous phase is washed once with ether. The water phase is then stirred with $CHCl_3$ and made basic with an ice-aqueous KOH mixture. The slimy precipitate is removed by filtration through filter aid and the filter cake is washed thoroughly with $CHCl_3$MeOH (1:1). The layers in the filtrate are separated and the aqueous phase is extracted three times with $CHCl_3$. The combined organic phase is washed with saturated salt solution and dried over $K_2CO_3$. Removal of solvent in vacuo and extraction of the resultant gum with heptane provides the crystalline title compound (600 mg.), M.P. 106–114° C.;

$\lambda_{max.}^{KBr}$ 3.46–3.54, 6.18, 6.28, 6.48, 6.71μ

Recrystallization from ethyl ether provides the pure title compound, M.P. 118–122° C.

2'-(4-chlorophenyl)quinidine hydrochloride is prepared by the procedure described for the preparation of the hydrochloride in Example 1. When recrystallized from isopropyl alcohol and diethyl ether demonstrates a M.P. 187–191° C.

EXAMPLE 5

2'-n-propylquinidine and hydrochloride

Following the procedure of Example 2 using n-propyl magnesium bromide, a yield of 33% of the amorphous title compound is provided. Following the procedure of Example 1, the amorphous title compound is converted to its dihydrochloride, a crystalline compound, M.P. 175° C.

Analysis.—Calcd for $C_{23}H_{30}N_2O_2 \cdot H_2O$ (percent): C, 60.38; H, 7.49; N, 6.12; Cl, 15.52. Found (percent): C, 60.60; H, 7.23; N, 6.14; Cl, 15.92.

Using the above procedure, the following compounds were provided in amorphous form as the free base which is then converted into the crystalline hydrogen chloride acid addition salt:

2'-(p-methoxyphenyl)quinine, dihydrochloride, M.P. 215° C.

Analysis.—Calcd for $C_{27}H_{30}N_2O_3 \cdot 2HCl$ (percent): C, 64.41; H, 6.41; N, 5.57; Cl, 14.08. Found (percent): C, 64.24; H, 6.58; N, 5.19; Cl, 13.86.

2'-(p-chlorophenyl)quinine, dihydrochloride, M.P. 215° C.

Analysis.—Calcd for $C_{26}H_{27}N_2O_2Cl \cdot 2HCl$ (percent): C, 64.48; H, 5.76; N, 5.52; Cl, 20.94. Found (percent): C, 61.62; H, 6.03; N, 5.24; Cl, 20.20.

2'-[p-trifluoromethyl)phenyl]quinine, dihydrochloride, M.P. 210–218° C.

Analysis.—Calcd. for $C_2H_{27}F_3N_2O_2 \cdot 2HCl$ (percent): C, 57.96; H, 5.58; N, 5.01; Cl, 12.78; F, 10.18. Found (percent): C, 58.31; H, 5.07; N, 5.06; Cl, 12.93; F, 9.55.

EXAMPLE 6

2'-isopentylquinidine and hydrochloride

Following the procedure of Example 2, using isopentyl magnesium bromide, a yield of 17% of the amorphous title compound is provided. Following the procedure of Example 1, the amorphous title compound is converted to its dihydrochloride, a crystalline compound, M.P. 170–174° C.

Analysis.—Calcd. for $C_{25}H_{34}N_2O_2 \cdot 2HCl \cdot 2/3H_2O$ (percent): C, 62.62; H, 7.85; N, 5.84; Cl, 14.79. Found (percent): C, 62.54; H, 7.53; N, 5.83; Cl, 14.50.

EXAMPLE 7

2'-dimethylamino-n-propylquinidine

Following the procedure of Example 2, using the Grignard reagent, dimethylamino-n-propyl magnesium bromide, the title compound is provided as an amorphous solid having the molecular formula $C_{25}H_{35}N_3O_2$ with a calculated m/e of 409. Experimentally, an m/e of 409 is confirmed. Experimental m/e is determined on an AEI MS–902 mass spectrometer at low resolution. The spectras were examined for their molecular ion and major fragmentation; only the molecular ion is reported.

EXAMPLE 8

2'-[p-trifluoromethyl)phenyl]quinidine
and hydrochloride

Following the procedure of Example 3, using p-(trifluoromethyl)phenyl magnesium bromide, the amorphous title compound is provided in a 40% yield. The dihydrochloride is provided by the procedure set forth in Example 1 and melts at 198–200° C.

Analysis.—Calcd. for $C_{27}H_{27}F_3N_2O_2 \cdot 2HCl \cdot H_2O$ (percent): C, 57.96; H, 5.59; N, 5.01; Cl, 12.67. Found (percent): C, 57.86; H, 5.62; N, 4.91; Cl, 12.83.

Following the above procedure, using the appropriate starting materials, is produced 2'-(p-fluorophenyl)quinine, M.P. 130° C., which is converted to 2'-(p-fluorophenyl)quinine, dihydrochloride, M.P. 215° C.

Analysis.—Calcd. for $C_{26}H_{27}FN_2O_2 \cdot 2HCl$ (percent): C, 63.54; H, 5.95; N, 5.70; Cl, 14.4; F, 3.87. Found (percent): C, 63.12; H, 5.82; N, 5.70; Cl, 13.8; F, 4.22.

EXAMPLE 9

2'-(p-fluorobenzyl)quinidine

Following the procedure of Example 3, using p-fluorobenzyl magnesium bromide, the title compound is provided in a 6% yield. Calculated for a molecular formula of $C_{27}H_{29}FN_2O_2$ with a calculated m/e of 432 which is confirmed by experimental findings.

EXAMPLE 10

The procedure of Example 1 is repeated, substituting for the methyl magnesium iodide, stoichiometrically-equivalent amounts of the following organo magnesium halides from which are provided the corresponding 2'-substituted-quindines:

$CH_3MgCl$, 2'-methylquinidine;
$CH_3MgBr$, 2'-methylquinidine;
$HC\equiv CMgBr$, 2'-ethynylquinidine;
$CH_3CH_2MgCl$, 2'-ethylquinidine;
$CH_3C\equiv CMgBr$, 2'-prop-1-ynylquinidine;
$F_3CCH_2CH_2MgCl$, 2'-(3,3,3-trifluoropropyl)quinidine;
$H_2C=CHCH_2MgCl$, 2'-prop-2-enylquinidine;
$CH_3CH_2CH_2MgCl$, 2'-propylquinidine;
$(CH_3)_2CHMgCl$, 2'-isopropylquinidine;
$H_2C=CHC\equiv CMgBr$, 2'-but-1-yn-3-enylquinidine;
$CH_3CH_2C\equiv CMgBr$, 2'-but-1-ynylquinidine;
$H_2C=CBrCH_2CH_2MgBr$, 2'-(3-bromobut-3-enyl)quinidine;
$H_2C=CHCH_2CH_2MgBr$, 2'-but-3-enylquinidine;
$H_2C=C(CH_3)CH_2MgBr$, 2'-(2-methylprop-2-enyl)quinidine;
$CH_3(CH_2)_2CH_2MgCl$, 2'-butylquinidine;
$CH_3(CH_2)_2CH_2MgBr$, 2'-pentylquinidine;
$(CH_3)_2N-(CH_2)_3MgCl$, 2'-[3-(dimethylamino)propyl]quinidine;
$(CH_3)_2N-(CH_2)_{10}MgCl$, 2'-[10-(dimethylamino)decyl]quinidine;
$[CH_3(CH_2)_4]_2N-(CH_2)_4MgCl$, 2'-[4-(dihexylamino)butyl]quinidine;
$C_5H_9MgBr$, 2'-cyclopentylquinidine;
$C_6H_{11}MgBr$, 2'-cyclohexylquinidine;
2—$ClC_6H_4MgBr$, 2'-(o-chlorophenyl)quinidine;
3—$ClC_6H_4MgBr$, 2'-(m-chlorophenyl)quinidine;
4—$BrC_6H_4MgI$, 2'-(p-chlorophenyl)quinidine;
3—$FC_6H_4MgBr$, 2'-(m-fluorophenyl)quinidine;
4—$FC_6H_4MgBr$, 2'-(p-fluorophenyl)quinidine;
$CH_3(CH_2)_4CH_2MgCl$, 2'-hexylquinidine;
3—F—4—$CH_3OC_6H_3MgBr$, 2'-(3-fluoro-p-anisyl)quinidine;
2—$CH_3C_6MgCl$, 2'-(o-tolyl)quinidine;
3—$CH_3C_6H_4MgCl$, 2'-(m-tolyl)quinidine;
4—$CH_3C_6H_4MgCl$, 2'-(p-tolyl)quinidine;
2—$CH_3OC_6H_4MgBr$, 2'-(o-anisyl)quinidine;
3—$CH_3OC_6H_4MgBr$, 2'-(m-anisyl)quinidine;
4—$CH_3OC_6H_4MgBr$, 2'-(p-anisyl)quinidine;
2—$CH_3CH_2C_6H_4MgBr$, 2'-(o-ethylphenyl)quinidine;
4—$CH_3CH_2C_6H_4MgBr$, 2'-(p-ethylphenyl)quinidine;
2,3-$(CH_3)_2C_6H_3MgBr$, 2'-(2,3-dimethylphenyl)quinidine;
2,4-$(CH_3)_2C_6H_3MgBr$, 2'-(2,4-dimethylphenyl)quinidine;
2,5-$(CH_3)_2C_6H_3MgBr$, 2'-(2,5-dimethylphenyl)quinidine;

2,6-(CH₃)₂C₆H₃MgBr, 2'-(2,6-dimethylphenyl)quinidine;
3,5-(CH₃)₂C₆H₃MgBr, 2'-(3,5-dimethylphenyl)quinidine;
2-CH₃CH₂OC₆H₄MgBr, 2'-(o-ethoxyphenyl)quinidine;
2-CH₃O-4-CH₃C₆H₃MgBr, 2'-(o-methoxy-p-tolyl)quinidine;
2,4-(CH₃O)₂C₆H₃MgI, 2'-(2,4-dimethoxyphenyl)quinidine;
4-CH₃CH₂CH₂C₆H₄MgBr, 2'-(p-propylphenyl)quinidine;
2,3,4-(CH₃)₃C₆H₂MgBr, 2'-(2,3,4-trimethylphenyl)quinidine;
4-CH₃CH₂CH₂OC₆H₄MgBr, 2'-(p-propoxyphenyl)quinidine;
2,6-(CH₃)₂-4-CH₃OC₆H₂MgBr, 2'-(2,6-dimethyl-p-anisyl)quinidine;
4-ClC₁₀H₆-1-MgBr, 2'-(4-chloro-1-naphthyl)quinidine;
6-ClC₁₀H₆-2-MgBr, 2'-(6-chloro-2-naphthyl)quinidine;
1-C₁₀H₇MgCl, 2'-(1-naphthyl)quinidine;
2-C₁₀H₇MgBr, 2'-(2-naphthyl)quinidine;
2,3,4,6-(CH₃)₄C₆HMgBr, 2'-(2,3,4,6-tetramethylphenyl)quinidine;
4-CH₃(CH₂)₄CH₂C₆H₄MgBr, 2'-(p-hexylphenyl)quinidine;
3-CH₃(CH₂)₃CH₂C₆H₄MgBr, 2'-(m-pentylphenyl)quinidine;
2,4,5-(CH₃)₃-3,6-(CH₃O)₂C₆MgBr, 2'-(3,6-dimethoxy-2,4,5-trimethylphenyl)quinidine;
4-(CH₃(CH₂)₄CH₂C₆H₄MgBr, 2'-(p-hexylphenyl)quinidine;
9-anthrylMgBr, 2'-(9-anthryl)quinidine;
9-phenanthrylMgBr, 2'-(9-phenanthryl)quinidine;
4-H₂C=CHC₆H₄MgBr, 2'-(p-ethenylphenyl)quinidine;
4-F₃CC₆H₄MgBr, 2'-[p-(trifluoromethyl)phenyl]quinidine;
3-F₃CC₆H₄MgBr, 2'-[m-(trifluoromethyl)phenyl]quinidine;
3,5-(F₃C)₂C₆H₃MgBr, 2'-[3,5-di(trifluoromethyl)phenyl-quinidine;
C₆H₅CH₂MgBr, 2'-benzylquinidine;
2-ClC₆H₄CH₂MgBr, 2'-(o-chlorobenzyl)quinidine;
3-ClC₆H₄CH₂MgBr, 2'-(m-chlorobenzyl)quinidine;
4-ClC₆H₄CH₂MgI, 2'-(p-chlorobenzyl)quinidine;
3-FC₆H₄CH₂MgBr, 2'-(m-fluorobenzyl)quinidine;
4-FC₆H₄CH₂MgBr, 2'-(p-fluorobenzyl)quinidine;
2,6-Cl₂C₆H₃CH₂MgCl, 2'-(2,6-dichlorobenzyl)quinidine;
3-F-4-CH₃OC₆H₃CH₂MgBr, 2'-(3-fluoro-4-methoxybenzyl)quinidine;
2-CH₃C₆H₄CH₂MgCl, 2'-(o-methylbenzyl)quinidine;
3-CH₃C₆H₄CH₂MgCl, 2'-(m-methylbenzyl)quinidine;
4-(CH₃C₆H₄CH₂MgCl, 2'-(p-methylbenzyl)quinidine;
2-CH₃OC₆H₄CH₂MgBr, 2'-(o-methoxybenzyl)quinidine;
3-CH₃OC₆H₄CH₂MgBr, 2'-(m-methoxybenzyl)quinidine;
4-CH₃OC₆H₄CH₂MgBr, 2'-(p-methoxybenzyl)quinidine;
2-CH₃CH₂C₆H₄CH₂MgBr, 2'-(o-ethylbenzyl)quinidine;
4-CH₃CH₂C₆H₄CH₂MgBr, 2'-(p-ethylbenzyl)quinidine;
2,4-(CH₃)₂C₆CH₂MgBr, 2'-(2,3-dimethylbenzyl)quinidine;
2,4-(CH₃)₂C₆H₃CH₂MgBr, 2'-(2,4-dimethylbenzyl)quinidine;
2,5-(CH₃)₂C₆H₃CH₂MgBr, 2'-(2,5-dimethylbenzyl)quinidine;
2,6-(CH₃)₂C₆H₃CH₂MgBr, 2'-(2,6-dimethylbenzyl)quinidine;
3,5-(CH₃)₂C₆H₃CH₂MgBr, 2'-(3,5-dimethylbenzyl)quinidine;
2-CH₃CH₂OC₆H₄CH₂MgBr, 2'-(o-ethoxybenzyl)quinidine;
2-(CH₃O-4-CH₃C₆H₃CH₂MgBr, 2'-(o-methoxy-p-methylbenzyl)quinidine;
2,4-(CH₃O)₂C₆H₃CH₂MgI, 2'-(2,4-dimethoxybenzyl)quinidine;
4-CH₃CH₂CH₂C₆H₄CH₂MgBr, 2'-(p-propylbenzyl)quinidine;
2,3,4-(CH₃)₃C₆H₂CH₂MgBr, 2'-(2,3,4-trimethylbenzyl)quinidine;
4-CH₃CH₂CH₂OC₆H₄CH₂MgBr, 2'-(p-propoxybenzyl)quinidine;
2,6-(CH₃)₂-4-CH₃OC₆H₂CH₂MgBr, 2'-(p-methoxy-2,6-dimethyl)quinidine;
4-BrC₁₀H₆-1-CH₂MgBr, 2'-(4-bromo-1-naphthal)quinidine;
5-BrC₁₀H₆-2-CH₂MgBr, 2'-(5-bromo-2-naphthal)quinidine;
4-ClC₁₀H₆-1-CH₂MgBr, 2'-(4-chloro-1-naphthal)quinidine;
6-ClC₁₀H₆-2-CH₂MgBr, 2'-(6-chloro-2-naphthal)quinidine;
1-(C₁₀H₇CH₂MgCl, 2'-(1-naphthal)quinidine;
2-C₁₀H₇CH₂MgBr, 2'-(2-naphthal)quinidine;
2,3,4,6-(CH₃)₄C₆HCH₂MgBr, 2'-(2,3,4,6-tetramethylbenzyl)quinidine;
4-CH₃(CH₂)₄CH₂C₆H₄CH₂MgBr, 2'-(p-hexylbenzyl)quinidine;
3-CH₃(CH₂)₃CH₂C₆H₄CH₂MgBr, 2'-(m-pentylbenzyl)quinidine;
(CH₃)₅C₆CH₂MgCl, 2'-(pentamethylbenzyl)quinidine;
2,4,5-(CH₃)₃-3,6-(CH₃O)₂C₆CH₂MgBr, 2'-(3,6-dimethoxy-2,4,5-trimethylbenzyl)quinidine;
4-CH₃(CH₂)₄CH₂C₆H₄CH₂MgBr, 2'-(p-hexylbenzyl)quinidine;
9-anthryl-CH₂MgBr, 2'-(9-anthrylmethyl)quinidine;
9-phenanthryl-CH₂MgBr, 2'-(9-phenanthrylmethyl)quinidine;
4-H₂C=CHC₆H₄CH₂MgBr, 2'-(p-ethenylbenzyl)quinidine;
4-HC≡CC₆H₄CH₂MgBr, 2'-(p-ethynylbenzyl)quinidine;
4-ClCH₂CH₂C₆H₄CH₂MgBr, 2'-[p-(2-chloroethyl)benzyl]quinidine;
4-ClCH=CHC₆H₄CH₂MgBr, 2'-[p-(2-chloroethenyl)benzyl]quinidine;
4-F₃CC₆H₄CH₂MgBr, 2'-[p-(trifluoromethyl)benzyl]quinidine;
3-F₃CC₆H₄CH₂MgBr, 2'-[m-(trifluoromethyl)benzyl]quinidine;
3,5-(F₃C)₂C₆H₃CH₂MgBr, 2'-[3,5-di(trifluoromethyl)benzyl]quinidine;
2-ClC₆H₄(CH₂)₃MgBr, 2'-(o-chlorophenylpropyl)quinidine;
3-ClC₆H₄(CH₂)₂MgBr, 2'-(m-chlorophenethyl)quinidine;
4-BrC₆H₄(CH₂)₃MgI, 2'-(p-chlorophenylpropyl)quinidine;
3-FC₆H₄(CH₂)₂MgBr, 2'-(m-fluorophenylethyl)quinidine;
4-FC₆H₄(CH₂)₂MgBr, 2'-(p-fluorophenylethyl)quinidine;
2,6-Cl₂C₆H₃(CH₂)₂MgBr, 2'-(2,6-dichlorophenylethyl)quinidine;
3-F-4-CH₃OC₆H₃(CH₂)₃MgBr, 2'-(3-fluoro-p-anisylpropyl)quinidine;
2-CH₃C₆H₄(CH₂)₂MgCl, 2'-(o-tolylethyl)quinidine;
3-CH₃C₆H₄(CH₂)₂MgCl, 2'-(m-tolylethyl)quinidine;
4-CH₃C₆H₄(CH₂)₃MgCl, 2'-(p-tolylpropyl)quinidine;
2-CH₃OC₆H₄(CH₂)₂MgBr, 2'-(o-anisylethyl)quinidine;
3-CH₃OC₆H₄MgBr, 2'-(m-anisyl)quinidine;
4-CH₃OC₆H₄(CH₂)₂MgBr, 2'-(p-anisylethyl)quinidine;

2,3-$(CH_3)_2$-4-$BrC_6H_2(CH_2)_3MgBr$, 2'-(p-bromo-2,3-dimethylphenyl)quinidine;
2-$CH_3CH_2C_6H_4(CH_2)_2MgBr$, 2'-(o-ethylphenylethyl)quinidine;
4-$CH_3CH_2C_6H_4(CH_2)_2MgBr$, 2'-(p-ethylphenylethyl)quinidine;
2,3-$(CH_3)_2C_6H_3(CH_2)_4MgBr$, 2'-(2,3-dimethylphenylbutyl)quinidine;
2,4-$(CH_3)_2C_6H_3(CH_2)_2MgBr$, 2'-(2,4-dimethylphenylethyl)quinidine;
2,5-$(CH_3)_2C_6H_3(CH_2)_2MgBr$, 2'-(2,5-dimethylphenylethyl)quinidine;
2,6-$(CH_3)_2C_6H_3(CH_2)_3MgBr$, 2'-(2,6-dimethylphenylpropyl)quinidine;
3,5-$(CH_3)_2C_6H_3(CH_2)_2MgBr$, 2'-(3,5-dimethylphenylethyl)quinidine;
2-$CH_3CH_2OC_6H_4(CH_2)_3MgBr$, 2'-(o-ethoxyphenylpropyl)quinidine;
2-$CH_3O$-4-$CH_3C_6H_3(CH_2)_2MgBr$, 2'-(o-methoxy-p-tolylethyl)quinidine;
2,4-$(CH_3O)_2C_6H_3(CH_2)_2MgI$, 2'-(2,4-dimethoxyphenylethyl)quinidine;
4-$CH_3CH_2CH_2C_6H_4(CH_2)_2MgBr$, 2'-(p-propoxyphenylethyl)quinidine;
2,3,4-$(CH_3)_3C_6H_2(CH_2)_3MgBr$, 2'-(2,3,4-trimethylphenylpropyl)quinidine;
4-$CH_3CH_2CH_2OC_6H_4(CH_2)_2MgBr$, 2'-(p-propoxyphenylethyl)quinidine;
2,6-$(CH_3)_2$-4-$CH_3OC_6H_2MgBr$, 2'-(2,6-dimethyl-p-anisyl)quinidine;
4-$ClC_{10}H_6$-1-$(CH_2)_2MgBr$, 2'-(4-chloro-1-naphthylethyl)quinidine;
6-$ClC_{10}H_6$-2-$(CH_2)_2MgBr$, 2'-(6-chloro-2-naphthylethyl)quinidine;
1-$C_{10}H_7(CH_2)_2MgCl$, 2'-(1-naphthylethyl)quinidine;
2-$C_{10}H_7(CH_2)_2MgBr$, 2'-(2-naphthylethyl)quinidine;
2,3,4,6-$(CH_3)_4C_6H(CH_2)_3MgBr$, 2'-(2,3,4,6-tetramethylphenylpropyl)quinidine;
4-$CH_3(CH_2)_4CH_2C_6H_4(CH_2)_2MgBr$, 2'-(p-hexylphenylethyl)quinidine;
3-$CH_3(CH_2)_3CH_2C_6H_4(CH_2)_2MgBr$, 2'-(m-pentylphenylethyl)quinidine;
$(CH_3)_5C_6(CH_2)_2MgCl$, 2'-(pentamethylphenylethyl)quinidine;
2,4,5-$(CH_3)_3$-3,6-$(CH_3O)_2C_6(CH_2)_3MgBr$, 2'-(3,6-dimethoxy-2,4,5-trimethylphenylpropyl)quinidine;
4-$CH_3(CH_2)_4CH_2C_6H_4(CH_2)_2MgBr$, 2'-(p-hexylphenylethyl)quinidine;
9-anthryl-$(CH_2)_2MgBr$, 2'-(9-anthrylethyl)quinidine;
9-phenanthryl-$(CH_2)_2MgBr$, 2'-(9-phenanthrylethyl)quinidine;
4-$H_2C=CHC_6H_4(CH_2)_2MgBr$, 2'-(p-ethenylphenylethyl)quinidine;
4-$HC\equiv CC_6H_4(CH_2)_3MgBr$, 2'-(p-ethynylphenylpropyl)quinidine;
4-$ClCH=CHC_6H_4(CH_2)_2MgBr$, 2'-[p-(2-chloroethenyl)phenylethyl]quinidine;
4-$F_3CC_6H_4(CH_2)_2MgBr$, 2'-[p-(trifluoromethyl)phenylethyl]quinidine;
3-$F_3CC_6H_4(CH_2)_2MgBr$, 2'-[m-(trifluoromethyl)phenylethyl]quinidine;
3,5-$(F_3C)_2C_6H_3(CH_2)_2MgBr$, 2'-[3,5-di(trifluoromethyl)phenylethyl]quinidine.

These 2'-substituted-quinidine derivatives are converted to their hydrochloric acid addition salts, by following the procedure of Example 1.

EXAMPLE 11

The procedures of Examples 1 to 4 are repeated, substituting for the quinidine ar-N-oxide, stoichiometrically-equivalent amounts of the cinchona alkaloid ar-N-oxides derived from dihydroquinidine, cinchonine, dihydrocinchonine, quinine, dihydroquinine, cinchonidine and dihydrocinchonidine, providing the following 2'-substituted cinchona alkaloids:

2'-methyldihydroquinidine;
2'-ethyldihydroquinidine;
2'-phenyldihydroquinidine;
2'-(p-chlorophenyl)dihydroquinidine;
2'-(p-anisyl)dihydroquinidine;
2'-(m-tolyl)dihydroquinidine;
2'-[p-(trifluoromethyl)phenyl]dihydroquinidine;
2'-benzyldihydroquinidine;
2'-(p-chlorobenzyl)dihydroquinidine;
2'-methylcinchonine;
2'-ethylcinchonine;
2'-phenylcinchonine;
2'-(p-chlorophenyl)cinchonine;
2'-p-anisylcinchonine;
2'-[p-(trifluoromethyl)phenyl]cinchonine;
2'-benzylcinchonine;
2'-(p-trifluoromethyl)benzylcinchonine;
2'-methyldihydrocinchonine;
2'-ethyldihydrocinchonine;
2'-phenyldihydrocinchonine;
2'-(p-chlorophenyl)-dihydrocinchonine;
2'-benzyldihydrocinchonine;
2'-(p-trifluoromethyl)benzyldihydrocinchonine;
2'-methylquinine;
2'-ethylquinine;
2'-(p-chlorophenyl)quinine;
2'-[p-(trifluoromethyl)phenyl]quinine;
2'-benzylquinine;
2'-methyldihydroquinine;
2'-ethyldihydroquinine;
2'-(p-chlorophenyl)dihydroquinine;
2'-benzyldihydroquinine;
2'-(p-chlorobenzyl)dihydroquinine;
2'-methylcinchonidine;
2'-ethylcinchonidine;
2'-phenylcinchonidine;
2'-(p-chlorophenyl)cinchonidine;
2'-benzylcinchonidine;
2'-[p-(trifluoromethyl)benzyl]cinchonidine;
2'-methyldihydrocinchonidine;
2'-ethyldihydrocinchonidine;
2'-phenyldihydrocinchonidine;
2'-(p-chlorophenyl)dihydrocinchonidine;
2'-benzyldihydrocinchonidine;
2'-[m-(trifluoromethyl)benzyl]dihydrocinchonidine.

The compounds are transformed into their respective acid addition salts by the procedure of Example 1.

EXAMPLE 12

The procedure of Example 1 is repeated, substituting for the quinidine ar-N-oxide, stoichiometrically-equivalent amounts of the corresponding N-oxides of Example 6, and for the methyl magnesium iodide, stoichiometrically-equivalent amounts of the organomagnesium halides of Example 5. The corresponding 2'-substituted cinchona alkaloids of this invention are obtained. They are converted to their hydrochloric acid addition salts by the procedure of Example 1.

EXAMPLE 13

Following the procedure of Example 1, but substituting for hydrogen chloride, stoichiometrically-equivalent amounts of fumaric acid, malic acid, citric acid, tartaric acid, embonic acid, acetic acid, sulfuric acid and phosphoric acid, then freeze-drying the reaction mixture, the corresponding acid addition salts of 2'-methylquinidine are obtained as residues. In a similar manner, the corresponding acid addition salts of 2'-ethylquinidine, 2'-phenylquinidine and 2'-(4-chlorophenyl)-quinidine are prepared.

Following the above procedure, the new 2'-substituted alkaloids of Examples 5–7 are converted to the corresponding fumarates, maleates, citrates, tartrates, embonates, acetates, sulfates and phosphates.

EXAMPLE 14

2'-cyclopropylquinidine and hydrochloric acid addition salt

To a solution of cyclopropyl lithium in diethyl ether (250 ml.), prepared from lithium (4.475 g., 646 mmoles) and cyclopropyl bromide (36.7 g., 331 mmoles) [Seyforth and Cohen, J. Organometal Chem., 1, 15 (1963)] is added while stirring at 0–5° C. under nitrogen a solution of quinidine-ar-N-oxide (10.0 g., 29.5 mmoles) in benzene (200 ml.). When the addition is complete stirring under nitrogen is continued while allowing the reaction mixture to warm to room temperature over a period of one hour. The reaction is then stopped by chilling to 0–5° C., adding ice-water and then 2 N HCl to dissolve the precipitate. The small amount of tar remaining is dissolved in a minimum amount of methanol which is added to the main two phase mixture. The layers are then separated, the aqueous phase is washed once with a small quantity of ether, then made basic with cold 50% NaOH solution and then extracted thoroughly (5 times) with chloroform. The combined chloroform extracts are washed with saturated brine, dried over $K_2CO_3$ and solvent removed in vacuo to yield a dark tar which is chromatographed through a column of activated magnesium silicate. Fractions eluted with mixtures of 1% methanol in chloroform and 2% methanol in chloroform yield the title product as the crystalline free base (from heptane), M.P. 59–72° C.;

$\lambda_{max.}^{KBr}$ 3.45, 6.15, 6.22, 6.39, 6.64, 6.88µ

Mass spectrum, M+ at 364 m/e peaks at 136 m/e (characteristic for quinuclidine fragment [Budzikiewicz, Djerassi, Williams, "Structure Elucidation of Natural Products by Mass Spectrometry," vol. 1, p. 220]), M− 15 m/e (methylene+proton from rearrangement of cyclopropyl group), M− 40 m/e (loss of cyclopropyl less a proton), M− 135 m/e (quinoline+CH(OH)+cyclopropyl+proton+$CH_3O$). NMR signals at 1.04 and 0.95 (multiplet) p.p.m. confirm presence of cyclopropyl.

The free base (1.5 g.) is converted to the dihydrochloride (1.76 g.) M.P. 174.8° C.:

$\lambda_{max.}^{KBr}$ 2.96–3.10, 3.45, 3.87 (broad), 4.25 (shoulder), 6.05, 6.14, 6.62, 6.81, 6.99µ by the procedure described in Example 1.

EXAMPLE 15

2'-t-butylquinidine and hydrochloride

Following the procedure of Example 14 using lithio-t-butyl in place of the lithio-cyclopropyl, a yield of 11% of the title compound is provided. Following the procedure of Example 1, the title compound is converted to its crystalline dihydrochloride, $C_{24}H_{32}N_2O_2 \cdot 2HCl$, M.P. 240° C., with a calculated m/e for the free base of 380. Experimentally, a m/e for the free base of 380 is confirmed.

EXAMPLE 16

2'-(p-chlorophenyl)dihydroquinidine and hydrochloride

2'-(p-chlorophenyl)quinidine, dihydrochloride of Example 4 (2.6 g., 5 mol.) is dissolved in $CH_3COH$ (100 ml.) and added to pre-reduced 5% Pd/C (0.89 g.) in 25 ml. of $CH_3OH$ and hydrogenated at atmospheric pressure for 45 minutes. Hydrogen uptake stops after 5 mmol. of $H_2$ is taken up. The catalyst is then filtered off and the filtrate taken to dryness. The residue is dissolved in $H_2O$ and basified by the addition of NaOH solution. The aqueous phase is then extracted with $CHCl_3$ and the combined extracts are dried and concentrated in vacuo. The residue provides 1.02 g. of crystalline product, M.P. 163–174° C.

Analysis.—Calcd. for $C_{26}H_{29}ClN_2O_2$ (percent): C, 71.46; H, 6.69; N, 6.41; Cl, 8.10. Found (percent): C, 71.46; H, 6.80; N, 6.43; Cl, 7.80.

Following the procedure set forth in Example 1 for the preparation of acid addition salts with hydrogen chloride, the dihydrochloride of the title compound is prepared, M.P. 185–189°.

EXAMPLE 17

2'-n-propyldihydroquinidine and hydrochloride

Following a procedure similar to that set forth in Example 16, using 2'-n-propylquinidine of Example 5, the title compound is produced, M.P. 168–171° C.

Analysis.—Calcd. for $C_{23}H_{32}N_2O_2$ (percent): C, 74.96; H, 8.75; N, 7.60. Found (percent): C, 74.78; H, 8.66; N, 7.31.

Using a procedure similar to that described in Example 1, the dihydrochloride salt of the title compound is provided, M.P. 184–186°.

EXAMPLE 18

2'-phenyldihydroquinidine, monohydrate and hydrochloride

Following a procedure as set forth in Example 16 using 2'-phenylquinidine of Example 3, the title compound is produced, M.P. 260–270° C.

Analysis.—Calcd. for $C_{26}H_{30}N_2O_2 \cdot H_2O$ (percent): C, 74.25; H, 7.67; N, 6.66. Found (percent): C, 74.24; H, 7.46; N, 6.71.

Using a procedure as set forth in Example 1, the dihydrochloride salt of the title compound is provided, M.P. 184–187°.

EXAMPLE 19

2'-[p-(trifluoromethyl)phenyl]dihydroquinidine and hydrochloride

Following the procedure set forth in Example 16 using 2'-p-(trifluoromethyl)phenylquinidine of Example 8, the title compound is produced and is found to be amorphous.

Following the procedure as set forth in Example 1, the hydrogen chloride acid addition salt is formed as the title compound in the form of a dihydrochloride sesquihydrate, M.P. 201–205° C.

Analysis.—Calcd. for $C_{27}H_{29}N_2O_2F_3 \cdot 2HCl \cdot \frac{1}{2}H_2O$ (percent): C, 56.84; H, 6.01; N, 4.91; Cl, 12.43. Found (percent): C, 56.83; H, 5.43; N, 5.00; Cl, 12.23.

EXAMPLE 20

2'-[p-(trifluoromethyl)phenyl]dihydroquinine and hydrochloride

Following the procedure set forth in Example 16, using 2'-(α,α,α-trifluoro-p-tolyl)quinine of Example 5, the title compound is found to be a crystalline solid with a m/e calculated of 470 and is confirmed by experimental work. The dihydrochloride produced thereby a found to be amorphous.

EXAMPLE 21

Following the procedures set forth in Examples 16 to 20 (dihydrogenation), 2'-substituted-quinidine compounds of Example 10 are converted into the following compounds:

2'-(3,3,3-trifluoropropyl)dihydroquinidine;
2'-[3-(dimethylamino)propyl]dihydroquinidine;
2'-cyclohexyldihydroquinidine;
2'-(p-fluorophenyl)dihydroquinidine;
2'-(o-tolyl)dihydroquinidine;
2'-(p-anisyl)dihydroquinidine;
2'-(2,6-dimethylphenyl)dihydroquinidine;
2'-(2,3,4-trimethylphenyl)dihydroquinidine;
2'-(9-phenanthryl)dihydroquinidine;
2'-(p-fluorobenzyl)dihydroquinidine;
2'-(p-methylbenzyl)dihydroquinidine;
2'-(2,3-dimethylbenzyl)dihydroquinidine;
2'-(p-propylbenzyl)dihydroquinidine;
2'-(1-naphthal)dihydroquinidine;
2'-(9-phenanthrylmethyl)dihydroquinidine;

2'-[3,5-di(trifluoromethyl)benzyl]dihydroquinidine;
2'-(m-fluorophenylethyl)dihydroquinidine;
2'-(o-anisylethyl)dihydroquinidine;
2'-(2,3-dimethylphenylbutyl)dihydroquinidine;
2'-(2,4-dimethoxyphenylethyl)dihydroquinidine;
2'-(4-chloro-1-naphthylethyl)dihydroquinidine;
2'-[p-(trifluoromethyl)phenylethyl]quinidine.

Following the procedure of Example 1, the above compounds are converted to their respective acid addition salts with hydrogen chloride.

EXAMPLE 22

Following the procedures set forth in Example 16 to 20 (dihydrogenation), 2'-substituted-cinchonine, quinine and cinchonidine compounds of Example 11 are converted into the following dihydro compounds:

2'-methyldihydrocinchonine;
2'-ethyldihydrocinchonine;
2'-phenyldihydrocinchonine;
2'-(p-chlorophenyl)dihydrocinchonine;
2'-p-anisyldihydrocinchonine;
2'-[p-trifluoromethyl)phenyl]dihydrocinchonine;
2'-benzyldihydrocinchonine;
2'-(p-trifluoromethyl)benzyldihydrocinchonine;
2'-methyldihydroquinine;
2'-ethyldihydroquinine;
2'-(p-chlorophenyl)dihydroquinine;
2'-[p-(trifluoromethyl)phenyl]dihydroquinine;
2'-benzyldihydroquinine;
2'-methyldihydrocinchonidine;
2'-ethyldihydrocinchonidine;
2'-phenyldihydrocinchonidine;
2'-(p-chlorophenyl)dihydrocinchonidine;
2'-benzyldihydrocinchonidine;
2'-[p-(trifluoromethyl)benzyl]dihydrocinchonidine.

Following the procedure set forth in Example 1, the above compounds are converted to their respective acid addition salts with hydrogen chloride.

What is claimed is:
1. A compound of Formula I or II

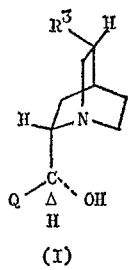 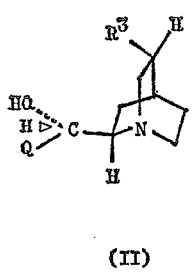

(I) (II)

or a pharmaceutically-acceptable acid-addition salt thereof, wherein

Q is a 4-quinolyl radical of the formula

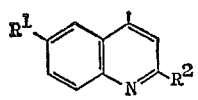

wherein $R^1$ is hydrogen or methoxy and
$R^2$ is phenyl substituted in the para-position with a halo, (lower)alkyl, (lower)alkenyl, (lower)alkynyl, monohalo(lower)alkyl, trifluoromethyl, (lower)alkoxy, or monohalo(lower)alkenyl group, wherein said (lower)alkyl, (lower)alkenyl, (lower)alkynyl, monohalo(lower)alkyl, (lower)alkoxy, and monohalo(lower)alkyl groups have hydrocarbon moieties of from one to six carbon atoms; and
$R^3$ is ethyl or vinyl.

2. A compound as defined in claim 1, of Formula I, wherein
$R^1$ is hydrogen or methoxy;
$R^2$ is p-(lower)alkoxyphenyl, p-(trifluoromethyl)phenyl, or p-halophenyl, and
$R^3$ is ethyl or vinyl.

3. A compound as defined in claim 1, of Formula II, wherein
$R^1$ is hydrogen or methoxy;
$R^2$ is p-(lower)alkoxyphenyl, p-(trifluoromethyl)phenyl, or p-halophenyl, and
$R^3$ is ethyl or vinyl.

4. A compound as defined in claim 3, which is 2'-(4-chlorophenyl)quinidine.

5. A compound as defined in claim 3, which is 2'-p-trifluoromethyl-phenylquinidine.

6. A compound as defined in claim 3, which is 2'-(p-chlorophenyl)dihydroquinidine.

7. A compound as defined in claim 3, which is 2'-[p-(trifluoromethyl)phenyl]dihydroquinidine.

8. A compound as defined in claim 2, which is 2'-(p-fluorophenyl)quinine.

9. A compound as defined in claim 2, which is 2'-(p-methoxyphenyl)quinine.

10. A compound as defined in claim 2, which is 2'-(p-chlorophenyl)quinine.

11. A compound as defined in claim 2, which is 2'-[p-(trifluoromethyl)phenyl]quinine.

12. A compound as defined in claim 2, which is 2'-[p-(trifluoromethyl)phenyl]dihydroquinine.

References Cited

UNITED STATES PATENTS

| | | | |
|---|---|---|---|
| 1,533,260 | 9/1925 | Thomas | 260—284 |
| 2,892,832 | 6/1959 | Rudner | 260—284 X |

OTHER REFERENCES

Yardley et al.: Jour. Med. Chem., vol. 14, p. 62 (1971).
Kobayashi: Abstracted in Chem. Abstr., vol. 45, col. 2491 (1951).

DONALD G. DAUS, Primary Examiner

U.S. Cl. X.R.
424—259